US009660972B1

(12) United States Patent
Roth et al.

(10) Patent No.: US 9,660,972 B1
(45) Date of Patent: May 23, 2017

(54) PROTECTION FROM DATA SECURITY THREATS

(75) Inventors: Gregory B. Roth, Seattle, WA (US); Graeme D. Baer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 13/532,753

(22) Filed: Jun. 25, 2012

(51) Int. Cl.
*H04L 29/06* (2006.01)
*G06F 21/62* (2013.01)

(52) U.S. Cl.
CPC .......... *H04L 63/08* (2013.01); *G06F 21/6218* (2013.01)

(58) Field of Classification Search
CPC ....... H04L 63/08; H04L 63/083; H04L 63/12; H04L 9/3226; H04L 9/3228; H04L 9/0844; H04L 9/3297; H04L 9/3242; H04L 9/0825; H04L 9/0863; G06F 21/31; G06F 2221/2151
USPC ................ 726/2–8, 21, 26–30; 713/182–185
See application file for complete search history.

(56) References Cited

U.S. PATENT DOCUMENTS

| | | | |
|---|---|---|---|
| 5,179,591 A | 1/1993 | Hardy et al. | |
| 5,200,999 A | 4/1993 | Matyas et al. | |
| 5,497,421 A * | 3/1996 | Kaufman et al. | 713/156 |
| 6,084,969 A | 7/2000 | Wright et al. | |
| 6,097,817 A | 8/2000 | Bilgic et al. | |
| 6,185,316 B1 | 2/2001 | Buffam | |
| 6,453,416 B1 | 9/2002 | Epstein | |
| 6,826,686 B1 * | 11/2004 | Peyravian et al. | 713/168 |
| 6,851,054 B2 | 2/2005 | Wheeler et al. | |
| 6,957,393 B2 | 10/2005 | Fano et al. | |
| 6,959,394 B1 * | 10/2005 | Brickell et al. | 726/5 |
| 6,985,583 B1 | 1/2006 | Brainard et al. | |
| 7,010,689 B1 | 3/2006 | Matyas et al. | |
| 7,073,195 B2 | 7/2006 | Brickell et al. | |
| 7,139,917 B2 * | 11/2006 | Jablon | 713/183 |
| 7,228,417 B2 * | 6/2007 | Roskind | 713/168 |
| 7,320,076 B2 | 1/2008 | Caronni | |
| 7,391,865 B2 | 6/2008 | Orsini et al. | |

(Continued)

FOREIGN PATENT DOCUMENTS

| | | |
|---|---|---|
| WO | WO2006077822 | 7/2006 |
| WO | WO2008024705 | 2/2008 |
| WO | WO2014063361 | 5/2014 |

OTHER PUBLICATIONS

Massachusetts Institute of Technology; Kerberos V5 System Administrator's Guide [online], May 2012 [retrieved on Jun. 27, 2012]; 57pgs. Retrieved from the Internet:<URL: http://web.mit.edu/kerberos/krb5-latest/krb5-1.10.2/doc/krb5-admin.html>.

(Continued)

*Primary Examiner* — Tae Kim
(74) *Attorney, Agent, or Firm* — Davis Wright Tremaine LLP

(57) ABSTRACT

A credential, such as a password, for an entity is used to generate multiple keys. The generated keys are distributed to credential verification systems to enable the credential verification systems to perform authentication operations. The keys are generated such that access to a generated key allows for authentication with a proper subset of the credential verification systems. Thus, unauthorized access to information used by one authentication system does not, by itself, allow for successful authentication with other authentication systems.

30 Claims, 13 Drawing Sheets

(56) References Cited

U.S. PATENT DOCUMENTS

| | | |
|---|---|---|
| 7,512,965 B1 | 3/2009 | Amdur et al. |
| 7,685,430 B1* | 3/2010 | Masurkar ..................... 713/182 |
| 7,721,322 B2 | 5/2010 | Sastry et al. |
| 7,757,271 B2 | 7/2010 | Amdur et al. |
| 7,765,584 B2* | 7/2010 | Roskind ............................. 726/5 |
| 7,836,306 B2* | 11/2010 | Pyle et al. .................... 713/169 |
| 7,890,767 B2* | 2/2011 | Smith et al. .................. 713/182 |
| 7,913,084 B2 | 3/2011 | Medvinsky et al. |
| 7,917,764 B2 | 3/2011 | Futa |
| 7,991,160 B2 | 8/2011 | Guccione et al. |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van de Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1* | 6/2013 | Chen et al. ................... 713/171 |
| 8,464,354 B2 | 6/2013 | Teow et al. |
| 8,504,836 B2 | 8/2013 | Zhang et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,594,323 B2 | 11/2013 | Dondeti |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth et al. |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1* | 6/2002 | Jablon .......................... 380/277 |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1* | 5/2004 | Larsen ............................. 707/9 |
| 2004/0128505 A1* | 7/2004 | Larsen ......................... 713/169 |
| 2004/0128510 A1* | 7/2004 | Larsen ......................... 713/171 |
| 2004/0131185 A1 | 7/2004 | Kakumer |
| 2004/0143733 A1 | 7/2004 | Ophir et al. |
| 2004/0158734 A1* | 8/2004 | Larsen ......................... 713/200 |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1* | 6/2005 | Jeffries et al. ................ 713/169 |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0062384 A1 | 3/2006 | Dondeti |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1* | 1/2007 | Pyle et al. .................... 713/156 |
| 2007/0033396 A1 | 2/2007 | Zhang et al. |
| 2007/0037552 A1 | 2/2007 | Lee et al. |
| 2007/0061571 A1* | 3/2007 | Hammes et al. ............. 713/168 |
| 2007/0061885 A1* | 3/2007 | Hammes et al. ............... 726/25 |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1* | 1/2009 | Bellifemine et al. ......... 709/218 |
| 2009/0049518 A1 | 2/2009 | Roman et al. |
| 2009/0100530 A1 | 4/2009 | Chen |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1* | 1/2010 | Jones ............................ 713/168 |
| 2010/0037304 A1 | 2/2010 | Canning et al. |
| 2010/0058060 A1* | 3/2010 | Schneider .................... 713/171 |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1* | 5/2010 | Schneider .................... 713/155 |
| 2010/0142704 A1 | 6/2010 | Camenisch et al. |
| 2010/0169646 A1 | 7/2010 | Zhang et al. |
| 2010/0205649 A1 | 8/2010 | Becker et al. |
| 2010/0239095 A1 | 9/2010 | Carter et al. |
| 2010/0251347 A1* | 9/2010 | Roskind ............................ 726/5 |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1* | 2/2011 | Pyle et al. .................... 713/169 |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1* | 6/2011 | Schneider .................... 713/171 |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |

(56) References Cited

U.S. PATENT DOCUMENTS

| | | | |
|---|---|---|---|
| 2011/0252229 A1* | 10/2011 | Belenkiy et al. | 713/155 |
| 2011/0265172 A1 | 10/2011 | Sharma et al. | |
| 2011/0296497 A1 | 12/2011 | Becker | |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036551 A1 | 2/2012 | Le Saint et al. | |
| 2012/0054625 A1 | 3/2012 | Pugh et al. | |
| 2012/0060035 A1 | 3/2012 | Kalmady et al. | |
| 2012/0106735 A1 | 5/2012 | Fukuda | |
| 2012/0110636 A1 | 5/2012 | Van Biljon et al. | |
| 2012/0144034 A1 | 6/2012 | McCarty | |
| 2012/0159577 A1 | 6/2012 | Belinkiy et al. | |
| 2012/0233216 A1 | 9/2012 | Lim | |
| 2012/0243687 A1 | 9/2012 | Li | |
| 2012/0245978 A1 | 9/2012 | Jain | |
| 2012/0265690 A1 | 10/2012 | Bishop et al. | |
| 2012/0317414 A1 | 12/2012 | Glover | |
| 2013/0031255 A1 | 1/2013 | Maloy et al. | |
| 2013/0086662 A1 | 4/2013 | Roth | |
| 2013/0086663 A1 | 4/2013 | Roth et al. | |
| 2013/0111217 A1 | 5/2013 | Kopasz et al. | |
| 2013/0132232 A1 | 5/2013 | Pestoni et al. | |
| 2013/0145447 A1 | 6/2013 | Maron | |
| 2013/0166918 A1* | 6/2013 | Shahbazi et al. | 713/183 |
| 2013/0191884 A1 | 7/2013 | Leicher et al. | |
| 2013/0198519 A1 | 8/2013 | Marien | |
| 2013/0254536 A1 | 9/2013 | Glover | |
| 2013/0282461 A1 | 10/2013 | Ovick et al. | |
| 2013/0318630 A1 | 11/2013 | Lam | |
| 2014/0013409 A1 | 1/2014 | Halageri | |
| 2014/0082715 A1 | 3/2014 | Grajek et al. | |
| 2014/0122866 A1 | 5/2014 | Haeger et al. | |
| 2014/0181925 A1 | 6/2014 | Smith | |
| 2014/0208408 A1 | 7/2014 | Bilgen et al. | |
| 2014/0281477 A1 | 9/2014 | Nayshtut et al. | |
| 2014/0281487 A1 | 9/2014 | Klausen et al. | |
| 2015/0082039 A1 | 3/2015 | Stalzer et al. | |
| 2015/0089614 A1 | 3/2015 | Mathew et al. | |

OTHER PUBLICATIONS

Massachusetts Institute of Technology; Kerberos V5 Installation Guide [online], May 2012 [retrieved on Jun. 27, 2012], 65pgs. Retrieved from the Internet:< http://web.mit.edu/kerberos/krb5-latest/krb5-1.10.2/doc/krb5-install.html>.

Massachusetts Institute of Technology; Kerberos V5 UNIX User's Guide [online], May 2012 [retrieved on Jun. 28, 2012], 38 pgs. Retrieved from the Internet:< http://web.mit.edu/kerberos/krb5-latest/krb5-1.10.2/doc/krb5-user.html>.

Simpson, W., Network Working Group, Request for Comments: 1994; PPP Challenge Handshake Authentication Protocol (CHAP) [online], Aug. 1996 [retrieved on Jun. 27, 2012], 13 pgs. Retrieved from the Internet:< http://etherpad.tools.ietf.org/html/rfc1994>.

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

Patent Cooperation Treaty, "Notification of Transmittal of the International Search Report and the Written Opinion of the International Searching Authority, or the Declaration," issued to International Application No. PCT/US/058083 on Dec. 27, 2012.

Roth et al.,"Hierarchical Data Access Techniques," U.S. Appl. No. 13/431,882, filed Mar. 27, 2012.

Wikipedia, "Physical unclonable function," retrieved Aug. 22, 2013, from http://en.wikipedia.org/wiki/Physical_unclonable_function, 8 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

* cited by examiner

Password Verification System Database

| Username | $S_1$ | KEY= PBKDF2(S1,PWD) | $S_2$ | H(PBKDF2(S2, PWD)) |
|---|---|---|---|---|
| Ilya | 1234 | PBKDF2(1234, ALYOSHA) | 4321 | H(PBKDF2(4321, ALYOSHA)) |

$PWD_{ILYA}$=ALYOSHA

Password Claim =(Sign(Snow, PBKDF2(1234, ALYOSHA)), PBKDF2(4321, ALYOSHA))

FIG. 10

PROTECTION FROM DATA SECURITY THREATS

CROSS REFERENCE TO RELATED APPLICATIONS

This application incorporates by reference for all purposes the full disclosure of co-pending U.S. patent application Ser. No. 13/532,768, filed Jun. 25, 2012, entitled "DECENTRALIZED VERIFICATION IN A DISTRIBUTED SYSTEM."

BACKGROUND

Computing environments take many forms. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages.

While diverse computing environments have proven useful for a wide variety of applications, such environments present many challenges. For example, configuring computer resources in furtherance of one organizational goal can adversely affect furtherance of another organizational goal. For example, effective management of computing resource security can often come at the cost of efficient access to data and services. Balancing the goals of security and efficiency can be quite challenging, often requiring significant effort and resources. In addition, the growing complexity of configurations of computing resources can provide numerous vulnerabilities. Effective management of these vulnerabilities while maintaining ease of use from the user perspective can be very difficult.

BRIEF DESCRIPTION OF THE DRAWINGS

Various embodiments in accordance with the present disclosure will be described with reference to the drawings, in which:

FIG. 10 shows a diagrammatic representation of password verifier database in accordance with at least one embodiment.

DETAILED DESCRIPTION

Figure 1:
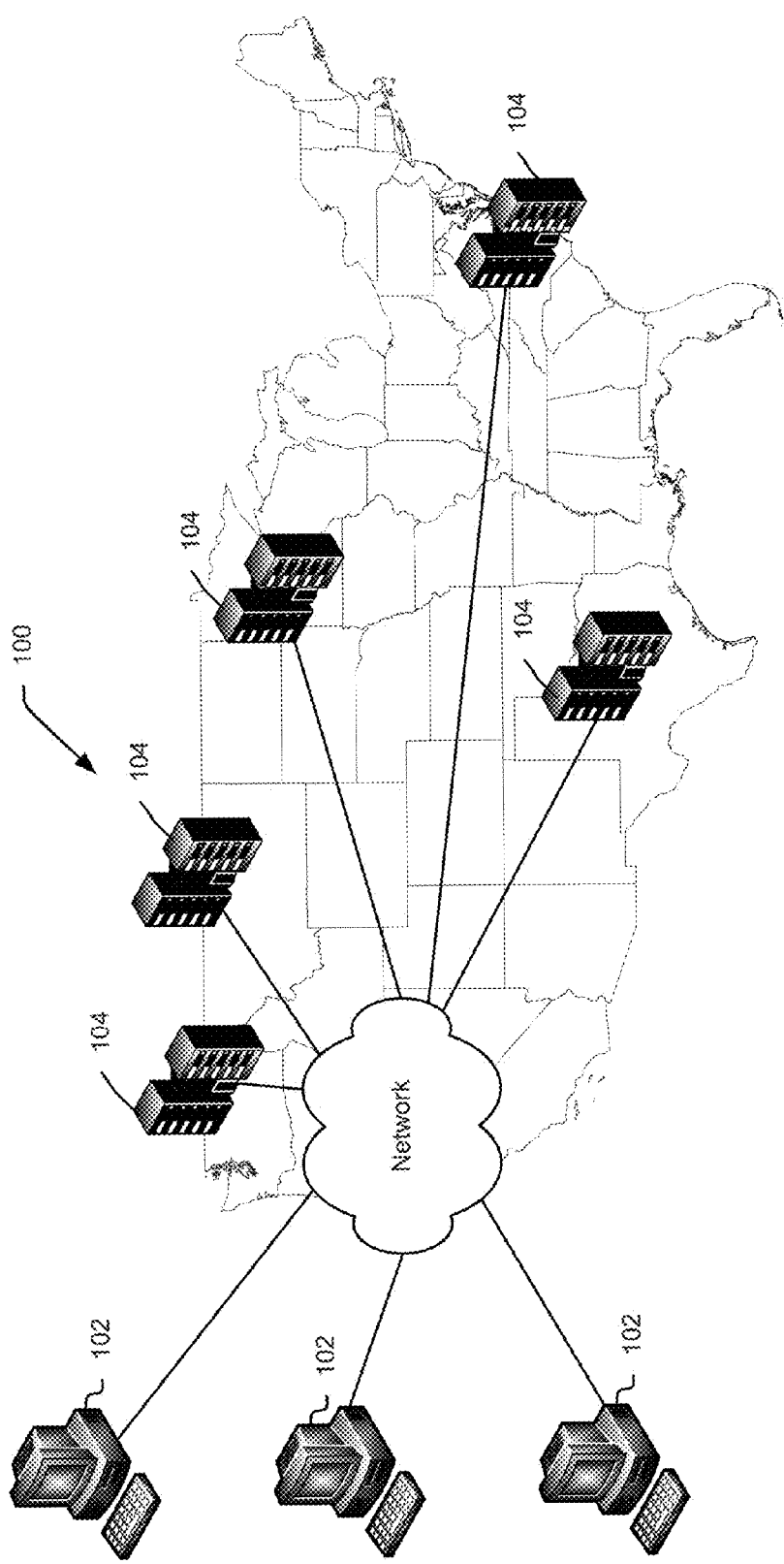
FIG. 1 shows an illustrative example of an environment in which various embodiments of the present disclosure may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods described and suggested herein relate to credential management for gaining access to computing resources. In one example, a distributed computing environment includes multiple zones. The zones may correspond to, for instance, facilities in different geographic regions, although other demarcations of the distributed computing environment are considered as being within the scope of the present disclosure. The distributed computing environment may operate with an objective, among other objectives, that a security breach in connection with one zone has a negligible or no effect on the data security of another zone.

To achieve this and other objectives, a distributed computing environment may include multiple password verification systems. As one example, each zone of the distributed computing environment may include its own password verification system. To access computing resources in a zone, a user (or computing device acting on behalf of a user or in an automated fashion) may have to authenticate itself with a password verification system for the zone. As one example, a user may have to provide a username and password to the password verification system, although other authentication techniques may also be used in conjunction with the various techniques described herein. To provide simplicity from the authenticating party perspective, the same password may be usable for authentication with some or even all of the password verification systems. However, while the same password may be used for authentication with multiple password verification systems, the password verification systems may be configured such that a security breach of one system does not or negligibly compromises the other password verification systems. Thus, access to one password verification system does not, by itself, enable impersonation of one or more users to other password verification systems.

In an embodiment, a distributed computing environment includes a key distribution system that centrally manages authentication data for multiple zones. The key distribution system may, for example, include data storage that stores passwords (or information generated based at least in part on passwords) for the distributed computing environment for use with multiple zones of the distributed computing environment. The key distribution system may use the stored passwords (or information generated based at least in part on the passwords) to generate keys for the zones and distribute the keys to the zones. For a password, each zone may receive a different key that was generated using the password. Further, the key may be generated in a manner such that possession of a key for one zone makes it impossible or at least cryptographically impractical to generate a key usable for successful authentication in another zone. Thus, a technical advantage is achieved in that unauthorized possession of a key for one zone is practically useless for authentication in other zones.

In one specific example, for a particular password, the key distribution system computes a preliminary key from the password and a salt. Computing the key may be performed, for instance, using the password and the salt as input to a password-based key derivation function. The computed preliminary key may then be used as an input to a function that takes information specific to a zone as another input to generate zone-specific keys for each zone. The information specific to the zone may be information that encodes one or more restrictions on use of the key. The information specific to the zone may be, for instance, an identifier of the zone so that the resulting key is only usable in that zone. Dates, times, identifiers of services available within the zone and other restrictions may be encoded in the information specific to the zone such that a resulting key is only usable in compliance with the restriction(s). The result (or information generated based at least in part on the result) may be provided to password verification systems of corresponding zones for use in authentication.

To authenticate, a client may use a password to generate a password claim that is then submitted to an appropriate password verification system. For example, the password claim may contain a corresponding key generated in the same manner as generated for the password verification system (or in a different manner that achieves the same result). As another example, the password claim may contain information generated based at least in part on the password, where the information is generable by the password verification system using an appropriate key provided to it from the key distribution system. The password verification system may compare information in the received password claim to its own information (either stored or generated from stored information) to make a determination on authentication. In this manner, the client is able to prove possession of the password without actually transmitting the password, thereby providing an advantage in that the password itself is less vulnerable to unauthorized access, such as by interception of an electronic transmission (or a collection of electronic transmissions) containing the password.

Numerous variations of the present disclosure are also within the scope of the present disclosure. For example, as noted, numerous techniques of authentication may be incorporated with the techniques described explicitly herein (and variations thereof). In one example, techniques for password-based authentication are described. The techniques may be used, for example, in a distributed computing environment, such as described above, although they may also be used in generally any environment where authentication is used. For example, the techniques may be used in connection with any password verification system and not necessarily password verification systems that utilize information provided from a central key distribution system. Specifically, techniques of the present disclosure enable authentication in a manner that enhances data security by preventing against multiple types of security breach.

In an embodiment, password claims submitted for the purpose of authentication contain at least two components, both of which are required for successful authentication and each of which provide a different security advantage. Both of the components may be based at least in part on the same password, although each component may be based at least in part on a different password in some embodiments. In an embodiment, one of the components is computed by first generating a key based at least in part on the password and then generating an electronic signature based at least in part on the generated key and a use parameter. The use parameter may be, for example, a current time or date. The other of the at least two components, in this example, may be a key generated based at least in part on the password. Both components of the at least two components may be generated also based at least in part on a salt and, in some embodiments, each of the at least two components are generated using a different salt.

A submitted password claim may be verified by a password verification that has (or, generally, has access to) a database of information used for authentication. In an embodiment, the database includes keys generated based at least in part on passwords and salts and hash values of keys generated based at least in part on passwords and salts. For example, for a particular password, the database may include a password generated based at least in part on the password (and possibly a salt) and a hash value of a key generated based at least in part on the password (and possibly the salt and/or another salt).

When a password claim is submitted, the password verification system may use its stored information to determine if the components of the submitted claim are valid. For example, continuing the present example, the password verification system may use its stored key to generate a signature and determine whether the signature matches the signature provided in the password claim. In some embodiments, such as when a date and/or time are used to generate the signature, the generated signature will only match the provided signature if the generated signature was produced using the same date/time. Thus, if the password verification system is configured to use a current time, the generated signature will match only if the password claim is current. Generally, the password verification system may be configured such that the provided signature will match only if the provided password was generated using the same parameters. Thus, when the provided signature is generated using one or more parameters not used by the password verification system, the signatures will not match. The password verification system may also compute a hash value of the received key to determine if the hash value matches the hash value stored in the database. If both components (and possibly other components, in systems that require more than two components) match, then authentication will be successful.

In this manner, interception of the password claim does not result in possession of the password. In addition, interception of the password, at most, may allow impersonation of the authenticating party submitting the claim only within the restriction(s) used to generate the signature, which may be limited to a short period of time and possibly to a geographic location. Similarly, unauthorized access to the database does not provide access to the key used to generate the hash value stored in the database. In other words, in some embodiments, intercepting a password claim provides access to one of at least two keys used while unauthorized access to the database provides access to the other of two keys used, but neither intercepting the password claim nor unauthorized access to the database provides access to both keys. Since both of the at least two keys used are required for authentication, unauthorized authentication becomes much more difficult as security breaches would typically involve both intercepting a transmission and unauthorized access to a database.

FIG. 1 is an illustrative example of an environment 100 (such as a distributed computing environment, described above) in which various aspects of the present disclosure may be implemented. As shown in FIG. 1, various client computer systems 102 access resources of a computing resource provider over a network. The client computer systems may be, for example, computer systems of customers of the computing resources provider. Generally, the client computer systems 102 may be any client computing device that is able to access another computing device over a communication network such as the Internet.

The computing resource provider, in an embodiment, provides one or more services on behalf of the customers corresponding to the client devices 102. Sample services include programmatically managed program execution services, data storage services and the like. Generally, the computing resources provider may provide any type of service which may be accessed over a network. For example, the computing resources provider may be an organization that provides various services over the Internet, such as through web pages and/or mobile applications. As just one example, a computing resources provider may be a bank where the client computer systems are utilized by customers of the bank, to enable the customers to access account information and other information and to make financial transactions using the computing resources of the bank. As another example, the client computing devices 102 may be computing devices of organizations that utilize resources of the computing resources provider as part of their infrastructure. For instance, a client computing device 102 may be utilized to programmatically manage or otherwise access servers, data storage and the like, where the hardware for the servers and data storage is physically hosted by the computing resources provider, such as in data centers owned and/or operated by the computing resources provider. It should be noted that, while various examples are given herein for the purpose of illustration, the scope of the present disclosure is not limited such examples. Generally, techniques described and suggested herein apply to any computing environment where access rights are apportioned into zones, as described in more detail below.

As illustrated in FIG. 1, the computing resources provider maintains a plurality of facilities 104. The facilities 104 may, for instance, be data centers which may be located in various geographic locations. Each of the facilities 104 may, for instance, have a different postal address. A customer of the computing resources provider may utilize resources in multiple geographic regions. As one example, a client device 102 may, in connection with user-input provided by a customer of the computing resource provider, manage a set of computing resources that support operation of a website. Web servers for the website may be located in various geographic regions so that, from the perspective of third party visitors to the website, effects due to latency, bandwidth and the like are minimized. For instance, as illustrated in FIG. 1, showing a map of the United States, third party visitors to the website may access the website using servers located on the West Coast, whereas third party visitors to the website may access web servers for the website located on the East Coast. Other reasons to utilize resources in multiple geographic locations may be to protect against various events such as power outages, system failures, natural disasters and other events that can affect a system's operation. Computing resources in multiple geographic locations may, for instance, be used to provide redundancy in infrastructure such that an event in one facility may have little or no effect on other facilities. For instance, if there is a power outage at one facility, services may be accessed from computer systems located in another facility.

While FIG. 1 illustrates various facilities located in different geographic locations, it should be noted that various aspects of the present disclosure are applicable in other instances when computing resources are divided into zones. The zones can be defined in various ways. As shown in FIG. 1, the zones are defined geographically. One or more data centers may exist in a particular zone, for example. Zones may be defined by various different types of boundaries for the zones. Computing resources in the form of computer hardware may, for instance, be considered in separate zones if the resources are in different server racks, in different rooms of the same facility and the like. Boundaries for zones may also be determined logically as well. For instance, two different applications, executing on a same piece of hardware, may be considered to be in different zones if there is some sort of logical separation between the applications. Similarly, two virtual computer systems operating on the same hardware computer system may be in different zones. Generally, zones may be defined by any way in which computing resources can be distinguished from one another.

In order to access computing resources in multiple zones, it is often desirable for clients 102 to authenticate themselves. For instance, when the computing resource provider provides hosts computing resources that are programmatically managed remotely by the clients 102, it is often desirable to utilize secure authentication protocols to ensure that the clients are managing their own resources so that others are unable to do so. In other words, if the computing resource provider hosts hardware used by multiple customers, it is desirable to ensure that customers are only able to manage their own resources and not those of other customers. Generally, any instances where data security is important may make it desirable to utilize authentication protocols to guard against unauthorized access.

When computing resources are apportioned among multiple zones, maintaining data security can present a challenge. For example, systems that verify passwords and other credentials may need to have up-to-date information so that authentication is successful when valid credentials are presented. In terms of security, various systems in place can create difficulties. For instance, if the same key is used for access in multiple zones, compromise of the key—that is, if the key is stolen—may create security issues in other zones. For instance, a key stolen from one zone may be used to access data in another zone. Similarly, actions that are taken to remediate against theft of credentials can be cumbersome. If multiple password verification systems, for example, authenticate using the same information, a breach of one system may cause updates to be necessary in all of the systems. Such system-wide updates can be burdensome, especially as the complexity of the whole system increases.

Figure 2:
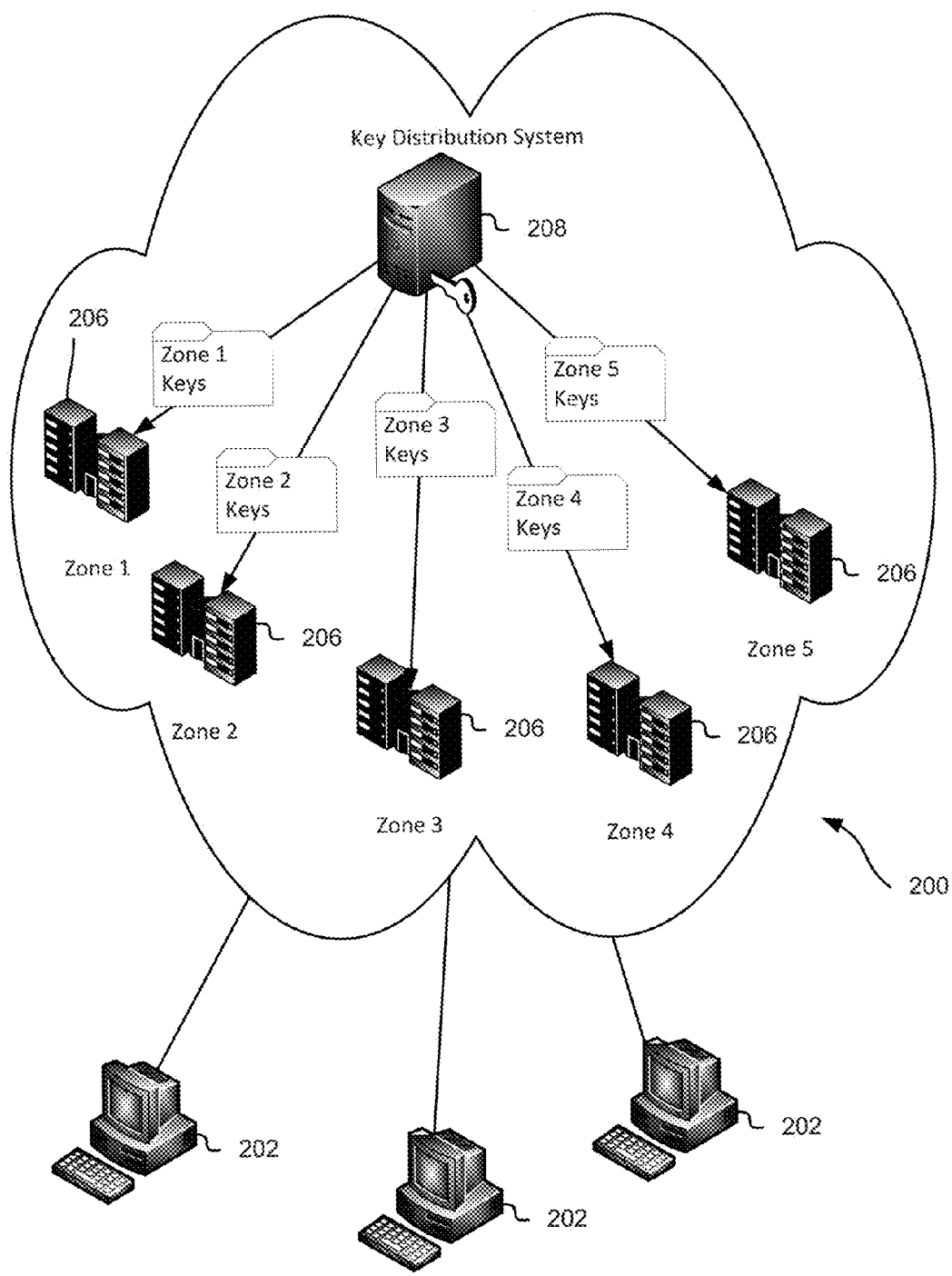
FIG. 2 shows an illustrative example of an environment which may be the environment of FIG. 1 in which various embodiments of the present disclosure may be practiced.

FIG. 2 shows an illustrative example of an environment in which various aspects of the present disclosure may be implemented. The environment shown in FIG. 2 may be, for example, the environment described above in connection with FIG. 1. As shown in FIG. 2, various client computing devices 202 access computing resources of a computing resources provider, where the resources exist among a plurality of zones 206. In addition, as illustrated in FIG. 2, the computing resource provider utilizes a key distribution system 208. The key distribution system 208, in an embodiment, is a computer system, which may comprise one or more hardware devices, that is configured to generate and distribute keys to the various zones in a secure manner. More specifically, the key distribution system 208 may generate keys and provide the keys in a secure electronic manner to password verification systems of the various zones 206. As shown in FIG. 2, the key distribution system 208 distributes different sets of keys to each of the zones. As described in more detail below, client computer systems are able to conveniently access the multiple zones despite multiple zones using different keys.

In an embodiment, each zone (which may be referred to as a key-use zone) includes its own password verification system. The password verification system may receive a set of the keys and use those keys in authentication operations, such as to validate passwords for the client computing devices, such as described below. In this manner, a technical advantage is achieved in that each password verification system includes a different set of keys. Thus, if a password verification system experiences a security breach, the breach may not affect other password verification systems that use different sets of keys. In addition, variations are considered as being within the scope of the present disclosure. For example, while the present disclosure describes embodiments where each zone includes its own password verification system, multiple key zones may share a password verification system. For example, a single password verification system may receive multiple sets of keys while one or more other password verification systems may each receive one or more other sets of keys. A password verification system with multiple sets of keys may store the sets separately, such as in separate data stores and/or under separate cryptographic protection such that multiple separate and independent security breaches are required for access to multiple sets of keys.

Figure 3:
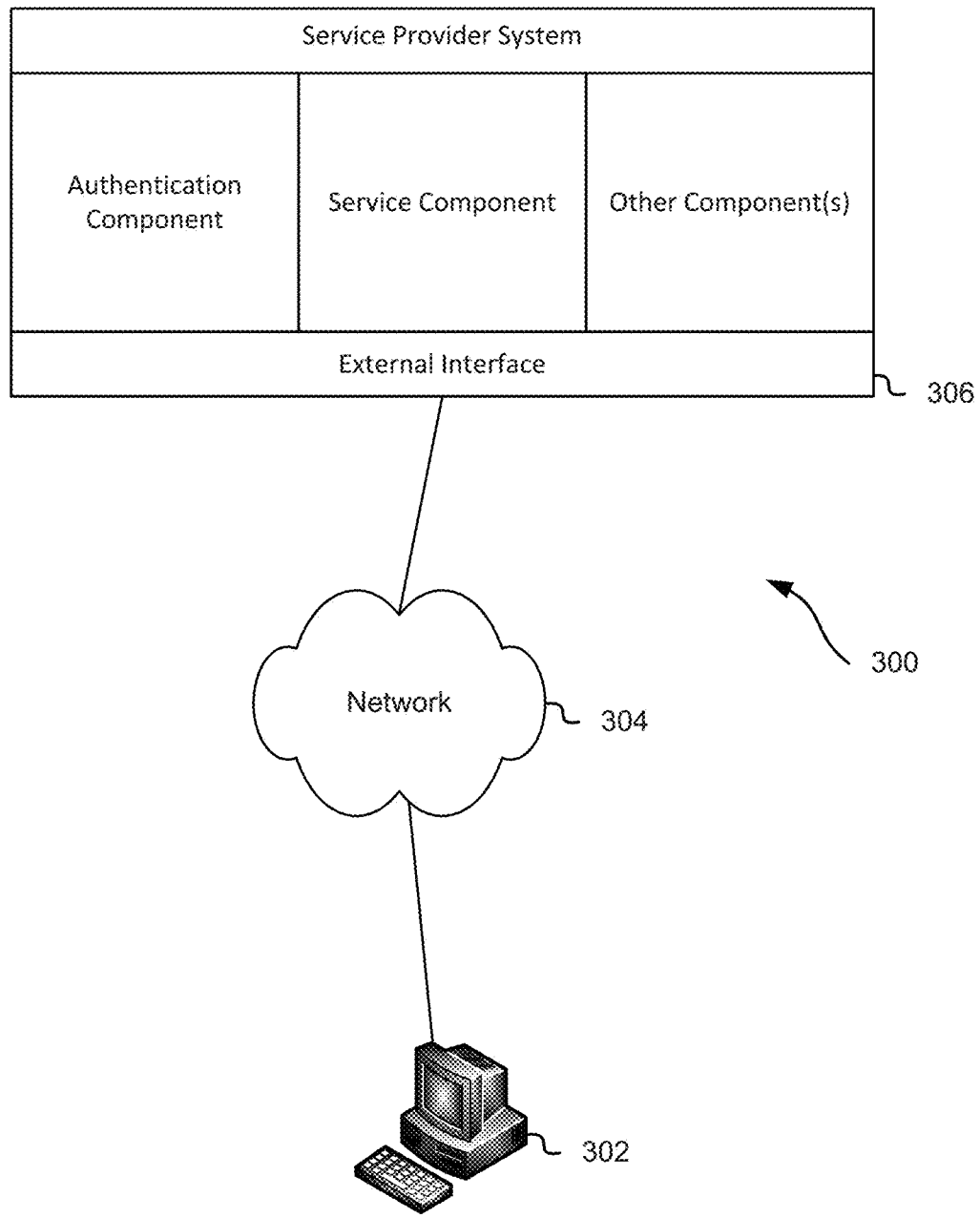
FIG. 3 shows a diagrammatic representation of communications between a client and a service provider in accordance with at least one embodiment.

FIG. 3 shows an illustrative example of an environment 300 which, as illustrated, may be a portion of the environment described above in connection with FIGS. 1 and 2. In particular, FIG. 3 shows a client's computing device 302 communicating over a network 304 to a service provider system 306. The service provider system 306 may be a computing device or multiple computing devices collectively configured to perform the functions described herein. In this example, the service provider system 306 includes multiple components. Each component may be a sub-system of the service provider system 306. For instance, the service provider system 306 includes an external interface such as an application programming interface (API) which may be utilized by the client computing device 302 to gain access to the resources of the service provider. The client computing device 302 may, for instance, electronically transmit requests through the network 304 to the external interface for such requests to be fulfilled. As illustrated in FIG. 3, the service provider system 306 includes an authentication component, a service component and possibly other components, such as accounting and other components that are used in various operations. The authentication component, in an embodiment, enables authentication of a client 302. For example, in one embodiment, when electronic requests are transmitted by the client computer system 302 to the service provider system 306, a system implementing the external interface (or another system) may make a determination whether the client computer system 302 is authenticated. The determination may be made based on information provided from the client 302. For example, if the client provides a currently valid session credential, the determination may be that the client is authenticated. If not, the external interface may communicate with the authentication component to authenticate the client computing device 302.

It should be noted that numerous embodiments for authentication are considered as being within the present disclosure. For instance, the client computing device may be prompted to provide credentials. Credentials provided over the network 304 through the external interface of the service provider system 306 may be passed to the authentication component for verification. The authentication component may then provide a response indicating the validity of the credentials. Determining the validity of credentials may be done in any suitable manner, such as in the ways described in more detail below. The service component of the service provider system 306 may comprise one or more computing devices that are configured to provide a service such as the services described above. For instance, a service component may include a plurality of servers which are hosted for customers of a computing resource provider and programmatically managed by the customers. Requests to access resources in the service component may be passed to the service component for processing. For instance, an API call to modify (e.g., reprogram, restart, turn on, turn off) a computing device in the service component may be processed by the service component. Acknowledgments and other relevant messages may be sent by the service component, through the network 304, to the client computing device 302.

Figure 4:
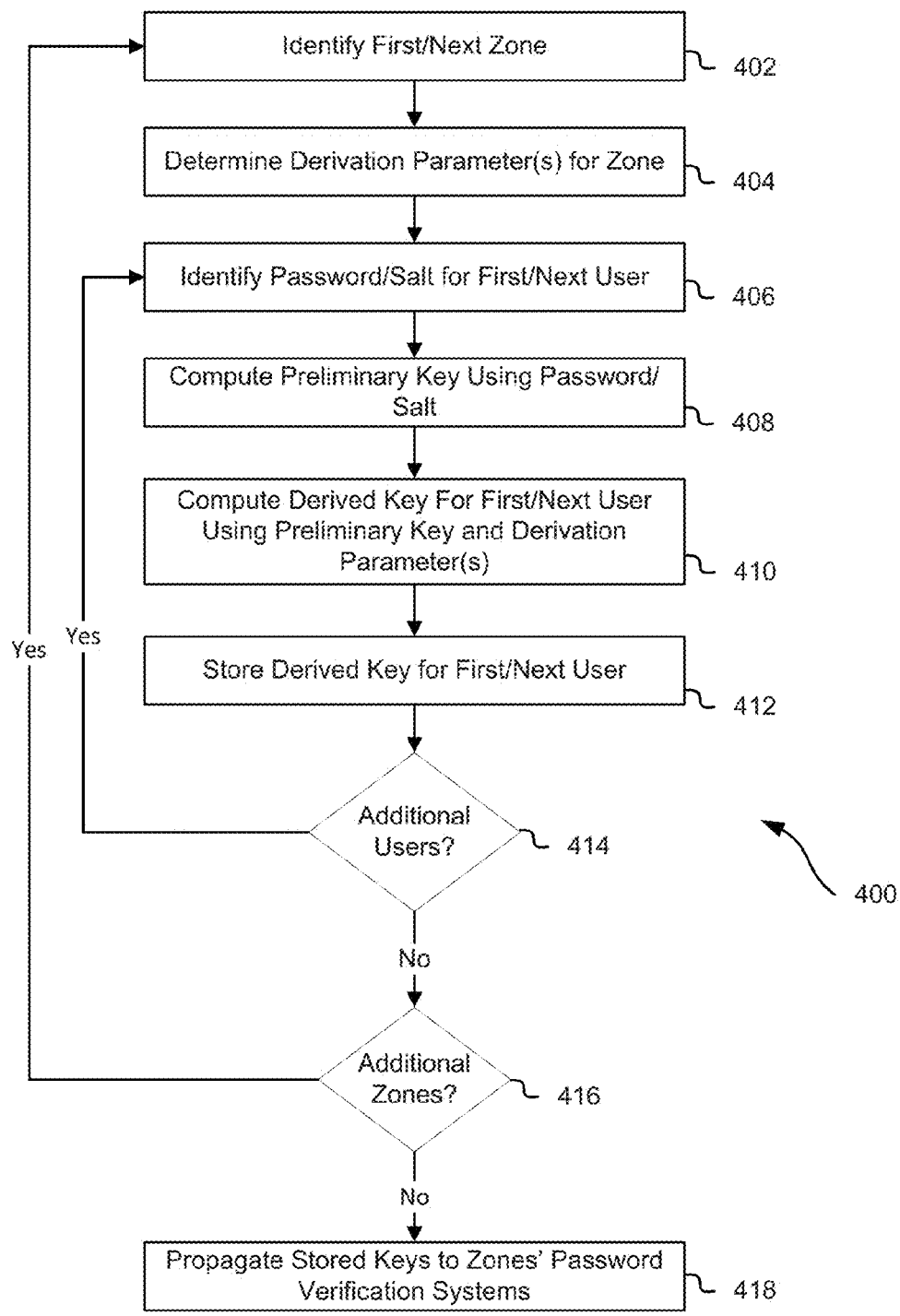
FIG. 4 shows an illustrative example of a process for propagating keys in accordance with at least one embodiment.

As discussed above, embodiments of the present disclosure involve the distribution of keys to multiple zones, for example, to different data centers. FIG. 4 accordingly shows an illustrative example of a process 400 for propagating keys to various zones in accordance with an embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The process 400 may be performed by a suitable computing device in a computing environment such as by a key distribution system described above in connection with FIG. 2. As shown in FIG. 4, the process 400, in an embodiment, includes identifying 402 a first zone. For instance, a computing resource provider may include multiple zones and the first zone may be first in a sequence of zones for which keys are to be distributed. The process 400, in an embodiment, includes determining 404 derivation parameters for the zone.

A derivation parameter may be any parameter used to derive a key. In an embodiment, a derivation parameter has, or at least corresponds to, a semantic meaning. A semantic meaning may be one or more restrictions on use of a key derived, using a parameter. In one example, a derivation parameter can be a date. In instances where a computing resource provider provides multiple services, a derivation parameter may be a name of a service. As yet another example, a derivation parameter may correspond to one or more users authorized to use a key derived, using a parameter. A parameter may be, for instance, a user identity or may be something that corresponds to one or more users such as a role of a user. Derivation parameters may be determined according to a canonical scheme. For instance, in the instance parameter such as a date, the date may be encoded in a canonical manner such that, as described below, others also using the derivation parameter (such as client devices of authenticating parties) will consistently encode the date (or other parameter). In this manner, computation utilizing derivation parameters will be consistent.

In an embodiment, the process 400 also includes identifying 406 a password for a first user. A password may be information that encodes a string of characters. The characters may comprise alpha-numeric characters and punctuation and/or other symbols that may be provided by a user via user input. It should be noted that a password may include one or more words, which may or may not be words found in a spelling dictionary. Thus, in some embodiments, a password may include spaces between other characters. As one illustrative example, a password may be a phrase comprising a plurality of words separated from one another by at least one space. As illustrated in FIG. 4, the process 400 may also include identifying a salt for the first user. A salt (i.e., cryptographic salt) may be a sequence of bits, which may be a sequence of random or pseudo-random bits, that is associated with the user. A salt may be used, for example, as input into a one-way function, as described below. By "one-way function," it should be noted that truly one-way functions may be used as may functions that are not known, but believed to be one-way or functions that are effectively one-way. Example functions include, but are not limited to cryptographic hash functions such as Secure Hash Algorithm 256 (SHA 256), the Rabin function and, generally, functions that are computationally impossible or impractical to invert given a random element from its image. It should be noted that, for the purposes of illustration, examples are provided herein, using salts, although different schemes may or may not use salts and saltless embodiments are considered as being within the scope of the present disclosure.

In an embodiment, a process 400 includes computing 408 a preliminary key, using the identified password and salt. Determining the key may be done in any suitable manner. In many instances, for the sake of cryptographic security, it is desirable to use the password and salt as inputs to functions with certain properties. In an embodiment, the function is a one-way function, which may be, or use, a cryptographic hash function. A function may also be a key derivation function such as the Password-Based Key Derivation Function Two (PBKDF2). Other examples that may be used include bcrypt and other functions that are pre-image resistant, such as keyed cryptographic hash functions.

As shown in FIG. 4, the process 400 also includes computing 410 a derived key (also referred to as a verification key) for the first user, using the preliminary key and the one or more derivation parameters. In an embodiment, the derived key is computed as a hash-based message authentication code (HMAC) of a key derivation parameter and the preliminary key. In embodiments where multiple derivation parameters are used, the derivation parameters may be input into the HMAC function iteratively. For example, HMAC of the preliminary key and the first derivation parameter may be computed, although other functions, including other signature generation functions, may be used. The result of that (or a value based at least in part therefrom) may be input with another derivation parameter into the HMAC function. The process may continue until all derivation parameters have been used to compute the derived key. In this manner, the derived key is computed, using multiple parameters which may be multiple restrictions on use of the key. For example, in the case where two derivation parameters are used, the two derivation parameters may be a service name and a date. Thus, as described in more detail below, a key derived from the parameters may be valid for that service on that date, but not with other services on that date, or not with the same service on a different date. Validity may be ensured due to, as described below, a password verification system using appropriate parameters and updating parameters that vary over time. For instance, because a password verification system will update time-based parameters, key validity depends on use of the same time-based parameters in a current manner because use of old information generated using old parameters will cause a mismatch between submitted information and information expected (for validity).

Continuing with the process 400, in an embodiment, the process includes storing 412 the derived key for the first user. As illustrated, the process repeats this process for multiple users if needed. For instance, in an embodiment, the process 400 includes determining 414 whether there are additional users and, if there are, a password and salt for the next user is identified 406. If preliminary key and derived key for the next user may then be computed such as described above. It should be noted that, while users are described for the purpose of illustration, the process may be performed for other authenticating entities, such as computer systems, sub-systems, groups of users, organizations and the like.

This process may continue until it is determined 414 that there are no additional users, at which a determination may be made 416 whether there are additional zones. If there are additional zones, in an embodiment, the process 400 includes identifying 402 a next zone and derivation parameters for the next zone may be determined such as described above. Derived keys may then be computed for one or more users such as described above. This process may continue until a determination is made 416 that there are no additional zones. At this point, as illustrated in FIG. 4, the process 400 includes propagating 418 stored keys to password verification systems for the various zones.

It should be noted that FIG. 4 shows a specific implementation of an embodiment of the present disclosure and that numerous variations are also considered as being within the disclosure. For instance, FIG. 4 shows an iterative process occurring within another iterative process. However, the process may proceed in a much different manner. For instance, the process 400 may iterate through a set of users and, for each user, may derive keys for each zone in which the user has access before computing derived keys for a next user. As another example of a variation that is within the scope of the present disclosure, keys may be propagated at a time different from that illustrated. For instance, keys may be propagated as computed. That is, a key may be computed and then transmitted to a password verification system accordingly or keys may be distributed in batches at different points in performance of the process 400. Generally, any process that computes and propagates keys in accordance with the various embodiments, with the various principles described herein, are considered as being within the scope of the present disclosure.

Figure 5:
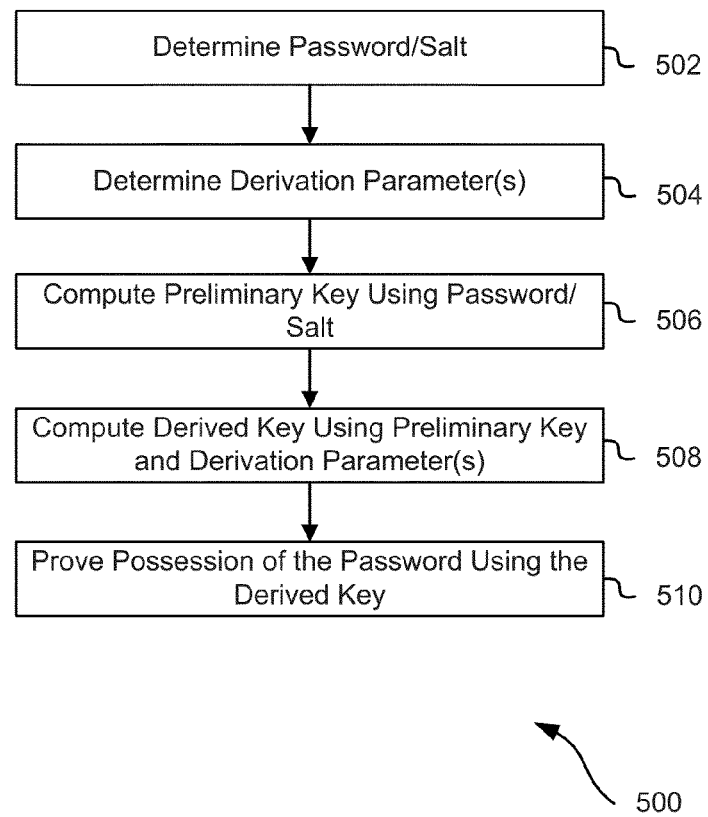
FIG. 5 shows an illustrative example of a process for accessing one or more computing resources in accordance with at least one embodiment.

Once the appropriate computer systems in various zones receives keys that have been propagated to them, the keys may be used for password verification. FIG. 5 shows an illustrative example of a process 500 which may be used to gain access to one or more computer resources. In an embodiment, the process 500 includes determining 502 a password and salt. Determining the password and salt may be done in any suitable manner. For example, both the password and salt may be accessed from computer memory of a computing device performing the process 500, which may be a client computing device such as described above. As another example, a salt may be stored in the memory of a computer system performing the process 500 and a password may be obtained, using user input. A user, for instance, may type or otherwise input a password into a graphical user interface of a computer system performing the process 500 or a computer in communication with the computer system performing the process 500.

In an embodiment, the process 500 includes determining 504 one or more derivation parameters such as described above. For instance, as noted, derivation parameters may be organized according to a canonical scheme. This canonical scheme may be used to determine the derivation parameters. For instance, one or more derivation parameters may be accessed from memory where derivation parameters may be stored so as to be in compliance with the canonical system. As another example, derivation parameters may be obtained by electronically requesting derivation parameters from another computer system. For instance, derivation parameters may be requested from a service provider computer system for which the process 500 is being performed for the purpose of authentication. Derivation parameters may be computed in other ways. For instance, an application of a computer system performing the process 500 may call a function that returns the current date if a date is a derivation parameter. The time may also be a derivation parameter. The value returned from the function, if not already in accordance with the canonical system, may be canonicalized, that is, may be transformed to be compliant with the canonical system. As an example, a date may be reformatted to be in compliance with a canonical system. A time may be rounded to a nearest hour, to a next hour or generally to some other time and the like. Determining 504 one or more derivation parameters may also include determining information specific to a key-use zone in which the computing resources to be accessed are accessible. For example, referring to FIG. 1, determining a derivation parameter may include determining a parameter (such as a zone name) specific to a facility (or set of facilities) in which the computing resources are located. Determining a derivation parameter may also include determining a service name (or other service-specific information) for a service that provides access to the computing resources. Generally, determining derivation parameter(s) may involve determining parameters for any restrictions on use of the key, where access to the computing resources is governed by the restrictions.

As illustrated in FIG. 5, process 500 includes computing 506 a preliminary key using the password and salt. For instance, the preliminary key may be computed, using the password and salt as inputs to PBKDF2 or any suitable function. Once the preliminary key is computed 506, a derived key may be computed 508, using the preliminary key and the one or more derivation parameters that were determined 504. Computing the derived key may be done as described above, for instance, by using the preliminary key and derivation parameters as inputs into HMAC. Once the derived key is computed 508, the process 500 includes proving 510 possession of the password, using the derived key. Proving possession of the password may be done in various ways, such as by providing the derived key and/or in other ways such as described below.

Figure 6:
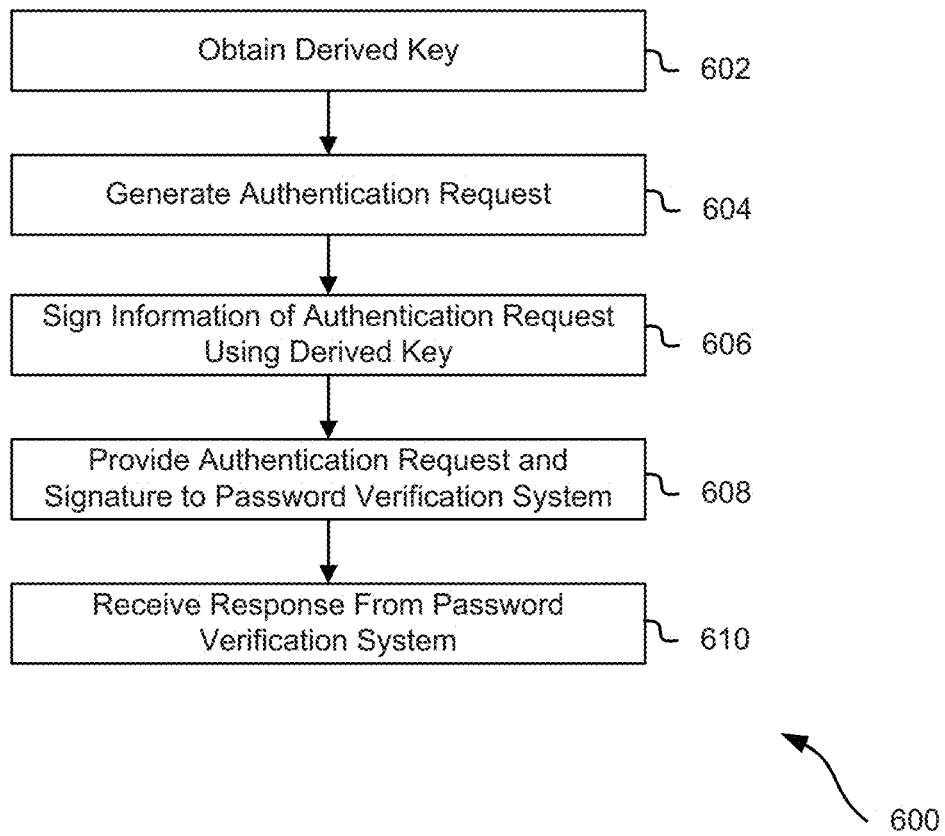
FIG. 6 shows an illustrative example of a process for proving possession of a password in accordance with at least one embodiment.

FIG. 6 accordingly shows an illustrative example of a process 600 which may be used to prove possession of a password using a derived key by providing a valid signature generated using the key, in accordance with an embodiment. In an embodiment, the process 600 includes obtaining 602 the derived key. Obtaining the derived key may be done in any suitable manner, such as by performing the process 500 described above. Obtaining the derived key may be done in other ways as well. For instance, obtaining a derived key may be performed by receiving the derived key from a different computer system that derived the key. Obtaining the derived key may also be performed by accessing the derived key from memory, either local memory or the memory of a remote computer system that is a different computer system.

Once the derived key has been obtained 602, in an embodiment, the process 600 includes generating 604 an authentication request. An authentication request may be an electronic message that encodes a request for authentication. The authentication request may include a current time stamp, that is information that encodes a current time. Information of the authentication request may be signed 606, using the derived key. For instance, in an embodiment, signing the information of the authentication request using a derived key includes generating a signature which may be the result of inputting the derived key and the authentication request into HMAC or using another way of generating an electronic signature. It should be noted that, in different embodiments, different types of signatures may be used. For example, some embodiments may make use of symmetric signatures while other embodiments may make use of asymmetric signatures. Generally, any method producing an electronic signature using the authentication request and derived key may be used, including by multiple invocations of HMAC or another function, each time inputting the result of a previous invocation and a different parameter. Once the information of the authentication request has been signed 606, the authentication request and signature may be provided 608 to a password verification system. The password and signature may, for instance, be encoded in one or more electronic messages transmitted over a network to the password verification system. The password verification system may then, as described below, check whether the signature is valid and provide a response accordingly. A response may then be received 610 from the password verification system, based on whether or not the signature was valid. As will be clear, validity of the signature corresponds to, in this example, possession of the password.

Figure 7:
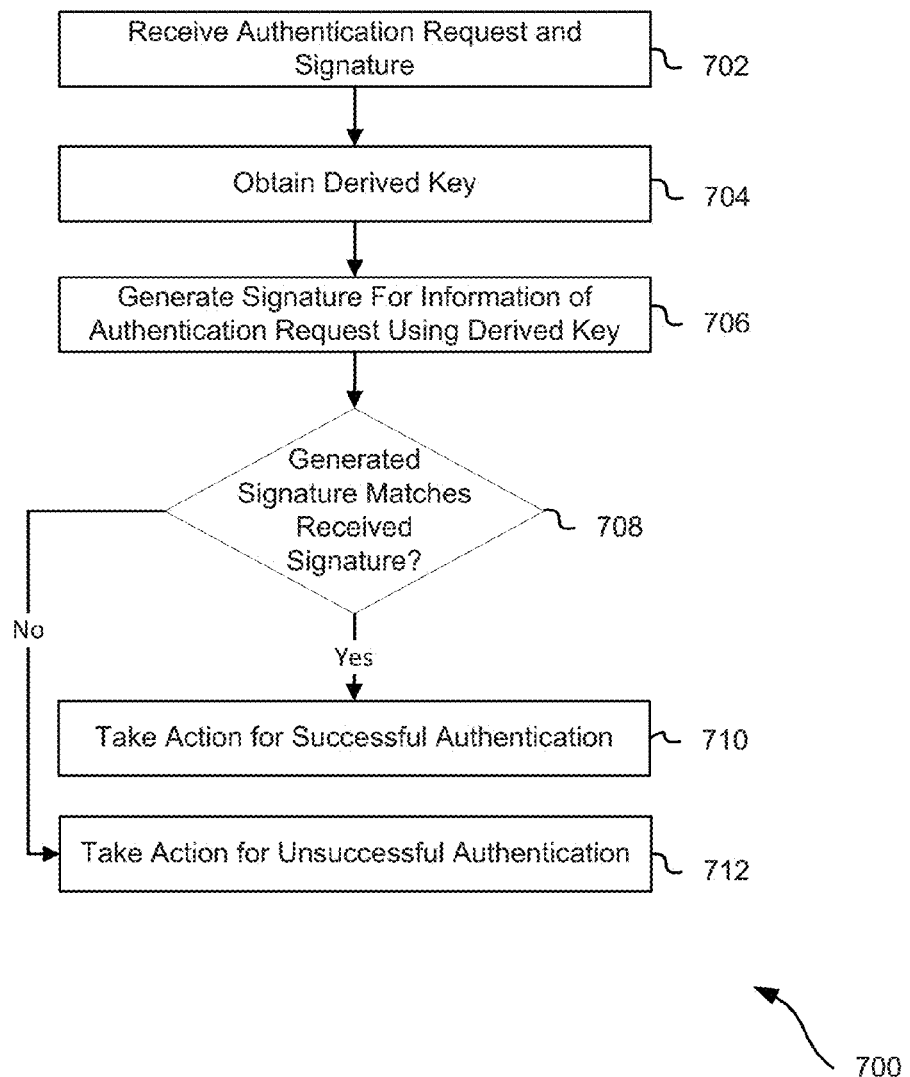
FIG. 7 shows an illustrative example of a process for verifying possession of a password in accordance with at least one embodiment.

FIG. 7 shows an illustrative example of a process 700 which may be performed to verify possession of a password when verification is done in accordance with the process 600 described above in connection with FIG. 6. The process 700 may be performed by any suitable device, such as by a password verification system, including, but not limited to, password verification systems described above. In this example, the process 700 includes receiving 702 an authentication request and a signature. For example, the authentication request and signature may be received electronically over a network. A derived key may then be obtained 704 such as described above. That is, the derived key may be obtained from memory, may be computed and/or may be obtained from a different computer system that has access to or that is able to compute the derived key. A signature for information of the authentication request may be generated 706, using the derived key, such as described above in connection with FIG. 6. In addition, generating the signature may be performed using the timestamp of the authentication request (and/or information based at least in part therefrom) as a derivation parameter or to determine a derivation parameter. For instance, the timestamp (and/or information based at least in part therefrom) may be input into HMAC or another suitable function as part of generating the signature. Generally, in embodiments utilizing time-dependent parameters, such time-dependent parameters may be determined in any suitable manner and may utilize timestamps, counters and/or other time-varying mechanisms.

A determination may then be made 708 whether the generated signature matches the received signature. In an embodiment, the generated signature matches the received signature if the generated signature is equal to the received signature. However, in various embodiments, a match (whether between signatures or between other pairs of values) does not require equality. For example, two values may match if they are not equal, but mathematically equivalent. As another example, two values may match if they correspond to a common object (e.g., value) or are in some predetermined way complementary and/or they satisfy one or more matching criteria. Generally, any way of determining whether there is a match may be used.

If it is determined 708 that the generated signature matches the received signature, then action for successful authentication may be taken 710. If, however, it is determined that the generated signature does not match the received signature, then action for unsuccessful authentication may be taken 712. Action for successful authentication may be any action for which the computer system performing the process 700 is programmed to take upon successful authentication. Such actions may vary depending on the various embodiments employing aspects of the present disclosure. For example, in one example, the action of successful authentication may be to provide a credential to a client computer system that provided the authentication request and signature, to enable to client computer system to provide the credential with subsequent requests to be made. When such requests are made in connection with the credential, the credential indicates that the client computer system is authenticated and therefore authorized to make the requests. Action for unsuccessful authentication may also vary, depending on various embodiments. For example, an electronic message may be sent to the client computer system notifying the client computer system that authentication was unsuccessful, to enable the client computer system to automatically or otherwise take action such as reattempting authentication. For instance, a user may be prompted on the client computer system to input the password again because a potential reason for the signature not matching may be because the user originally input the password incorrectly.

Variations to the process 700 (and other processes for authenticating a user) are considered as being within the scope of the present disclosure. For example, as noted above, communication with a password verification system (or other authentication system) may involve transmission of electronic communications having a time stamp. Also, the time stamp may be encoded in information that is electronically signed for a signature to be transmitted to the authentication system. An authentication system may determine whether the time stamp indicates a time that is sufficiently (e.g., according to a policy) current. For example, the authentication system may determine whether the timestamp is sufficiently close to a current time (where sufficiently close may be determined by a policy and may be predetermined). Successful authentication may be dependent on the determination. This provides an additional advantage in that, assuming use of a cryptographically sufficient signature function, someone who intercepts an authentication request and signature will not, without more, have enough information to generate a valid signature with a different time stamp. In this manner, a technical advantage is achieved in that interception of communications and later use for authentication is automatically prevented once a window during which the timestamp is current expires. In particular, because both the signature matching the request and the timestamp being current are required for successful authentication and because an interception of an authentication request and a signature does not itself provide the ability to validly sign authentication requests, interception of the authentication request and signature provides a much more limited security breach than provided by many conventional systems.

Figure 8:
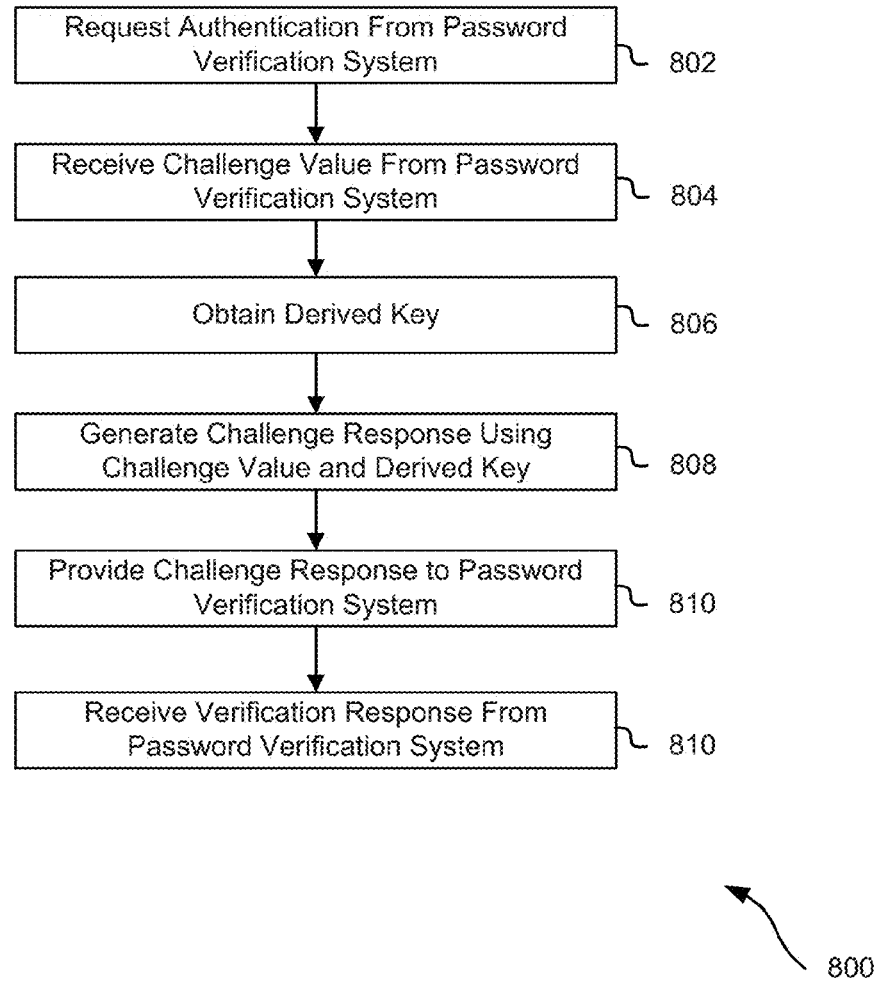
FIG. 8 shows an illustrative example of a process for proving possession of a password in accordance with at least one embodiment.

As noted, different ways of proving possession of the password may be used in accordance with different embodiments. FIG. 8, accordingly, shows an illustrative example of another process 800 proving possession of a password in accordance with an embodiment. The process 800 may be performed, for instance, by a client computer system described above or, generally, by any device of an authenticating party. As illustrated in FIG. 8, the process 800 includes a challenge and response mechanism to verify possession of the password. In an embodiment, the process 800 includes requesting 802 authentication from a password verification system. Requesting authentication may be done in any simple manner such as by transmitting a corresponding electronic message encoding the request. In response, in an embodiment, the process 800 includes receiving 804 a challenge value from the password verification system. The challenge value may be, for instance, a string of bits or other set of information. The client computer system may then obtain 806 a derived key such as described above. A challenge response may then be generated 808 using the challenge value and the derived key. The challenge value and derived key may, as an example, be input into a function and the challenge response may be the output of the function or otherwise based at least in part on the output of the function. An example function is HMAC or other functions described above or having properties. The challenge response may then be provided 810 to the password verification system. The password verification system may determine whether the challenge response indicates possession of the password and may provide a response accordingly. A verification response may then be received 810 from the password verification system. The verification response may be as described above.

Figure 9:
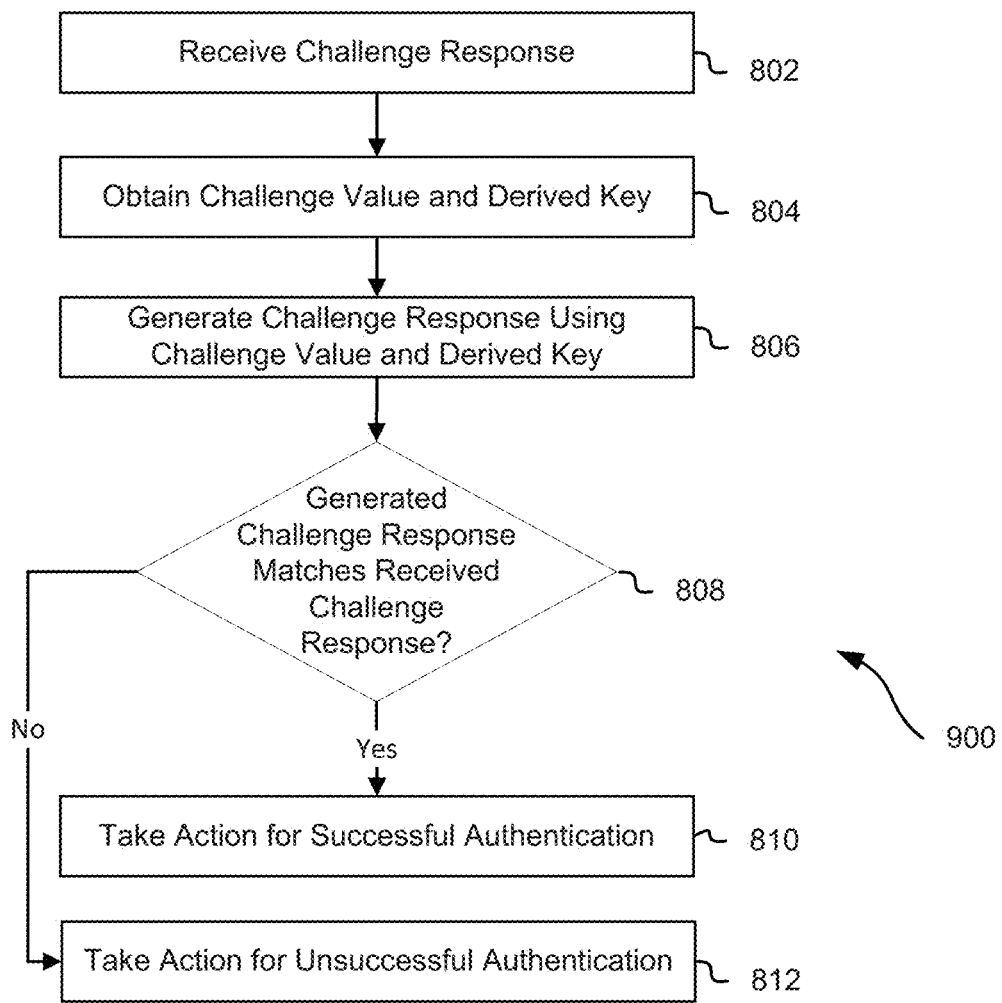
FIG. 9 shows an illustrative example of a process for verifying possession of a password in accordance with at least one embodiment.

FIG. 9 shows an illustrative example of process 900 which may be used to verify whether a challenge response indicates possession of a password in accordance with an embodiment. The process 900 may be performed by a password verification system, such as described above. In this particular example, the process 900 illustrated in FIG. 9 may be performed when a challenge response is submitted in accordance with the process 800 described above in connection with FIG. 8. Accordingly, in an embodiment, the process 900 includes receiving 902 a challenge response. For instance, an electronic message encoding a challenge response may be received over a network from a client computer system. A challenge value and derived key may then be obtained 804 such as from memory, from another computer system or by computation of the challenge value and/or derived key. A challenge response may then be generated 806 using the challenge value and derived key. In an embodiment, the challenge response is generated in the same manner in which the challenge response is generated at the client computer system. A determination may then be made 808 whether the generated challenge response matches the received challenge response, for instance, by determining whether the generated challenge response is identical to the received challenge response. If it is determined that the generated challenge response matches the received challenge response, then action for a successful authentication may be taken 810, such as described above. Similarly, if it is determined 808 that the generated challenge response does not match the received challenge response, then action for unsuccessful authentication may be taken 812 such as described above.

As noted above, despite best efforts to maintain security, vulnerabilities are often difficult to fully address. For instance, new ways of compromising computer systems may be invented and utilized to obtain access to information. Compromising various authentication schemes can be done in various ways. For instance, a conventional password verification system may include a database or other organization of information used to authenticate users. Unauthorized access to such a database may compromise the scheme by allowing those with unauthorized access to the database to impersonate users or perhaps by impersonate the password verification system. Similarly, information transmitted to a password verification system may be intercepted in transit. For instance, as described above, numerous embodiments of the present disclosure include transmitting electronically information from one computer system to the other. Often, transmission of such information requires the use of computing resources outside of one's control. For instance, messages traveling over the Internet may pass through numerous computer systems operated by third parties. As such, it is feasible that information transmitted over a network can be intercepted and used in a malicious way. Accordingly, embodiments of the present disclosure include multi-factored protection from different types of compromising of authentication systems.

FIG. 10 shows an illustrative example of a database which may be utilized by a password verification system. In this particular example, the database is arranged as a relational database where data is organized into columns and rows. It should be noted, however, that other methods of storing data in an organized manner may be used. For example, any method of storing information used to authenticate authenticating parties so that such information is locatable from data storage may be used. In this illustrative example using a database, the database includes a username column, the entries of which include identifiers of users which may be, for instance, users of the client computer systems described above. Entries may also identify other entities such as organizations or other groups of people and/or devices. A next column has entries corresponding to salts corresponding to the users in the same row. Each user may have, for instance, a different salt, although it is possible, in some embodiments, that some users may share the same salt. For example, salts may be generated in a manner (e.g., randomly) that makes it improbable, but unlikely that two users may have the same salt.

A next column has entries corresponding to a value obtained at least based in part on a password and a salt. In the illustrative example of FIG. 10, values in this column labeled "key" are values obtained as the output of PBKDF2 with inputs as the first salt and the password. As with other derived keys described herein, components in the key column (or other analogous organization of key data) may be values generated using any suitable method of generating keys and/or information derived therefrom.

A next column may correspond to a second salt, which, for each user name, may be different from the first salt, at least for some users. Finally, a last column may correspond to key hashes which are hash values derived based at least in part on keys. In this particular example, the entries of the last column are hash values obtained by inputting into a hash function the output of PBKDF2 when the inputs to PBKDF2 are the second salt and the password. Thus, in this manner, the database includes information that is based, at least in part, on the password, but the database does not contain the password itself. A row in this table corresponding to the name "Ilya" has example values provided for the purpose of illustration. It should be noted that different functions, values and such may be used in accordance with various embodiments and the specific functions and values used herein are provided for the purpose of illustration. Also, in accordance with various embodiments, relational databases used in accordance with the various embodiments will typically have multiple rows. Generally, a data store that stores authentication information for a password verification system may store data for multiple authenticating parties and may a data storage system that allows for retrieval of appropriate information for a party attempting authentication.

Numerous variations of what information is stored in the database (or another data store) are considered as being within the scope of the present disclosure. For example, techniques for authentication (described in more detail below) may be combined with techniques described above. As one example, entries in the key-hash column may be derived based at least in part on one or more key derivation parameters. For instance, instead of that which is illustrated in FIG. 10, the value stored may be:

HMAC("Date", PBKDF2($S_2$, PWD)).

As another example, the value stored may be:

HMAC("ZoneID", HMAC("Date", PBKDF2($S_2$, PWD))).

Date may be information that encodes the current date and "ZoneID" may be information that encodes a key-use zone. The value(s) itself/themselves may be provided (perhaps over a secure communications channel) to the database from a key distribution system, such as a key distribution system described above. The key distribution system may, for instance, provide the value on a daily basis for use in authentication. This achieves a technical advantage because unauthorized access to the database only provides information usable for authentication, at most in this example, for a twenty-four hour period.

Of course, different time periods, such as hours, days, weeks and even varying time periods may be used. In addition, additional parameters may be used in addition to or instead of time-based and zone-based parameters. For instance, the value stored may be:

HMAC("ServiceName", HMAC("ZoneID", HMAC("Date", PBKDF2($S_2$, PWD)))).

In this illustrative example, "ServiceName" may be information that encodes the name of a service for which the value may be used for authentication. Other parameters, such as identifiers of users and/or groups of users, may also be used in addition or instead of those explicitly shown herein. If additional parameters are used, one or more of the parameters may be stored in the database (or another database). For example, if authentication is requested by a user for access to a particular service, an appropriate value for that service may be accessed from a database or other data storage.

Other variations are also considered as being within the scope of the present disclosure. For example, HMAC is used above for the purpose of illustration, but other functions, such as functions with one or more properties in common with HMAC may be used. For instance, pre-image resistant functions may be used in various embodiments. In addition, while the above examples show iterative use of a single function, multiple functions may be used in deriving a value for the database. For instance, the result of one function may be input, with a parameter, into another function. The result of that may be input into yet another function (or another function already used or even the same function), perhaps with another parameter. As another example of a variation, values may be received from a key distribution system, such as described above and the values may further be modified for storage based at least in part on a salt. For instance, a value from a key distribution system may be input into PBKDF2 with a stored salt. In addition, it should be noted that the processes described herein may be modified to take into account of the numerous variations that are within the scope of the present disclosure. For instance, if any of the above values of HMAC are used in the database, processes may be adapted to verify password claims accordingly.

Figure 11:
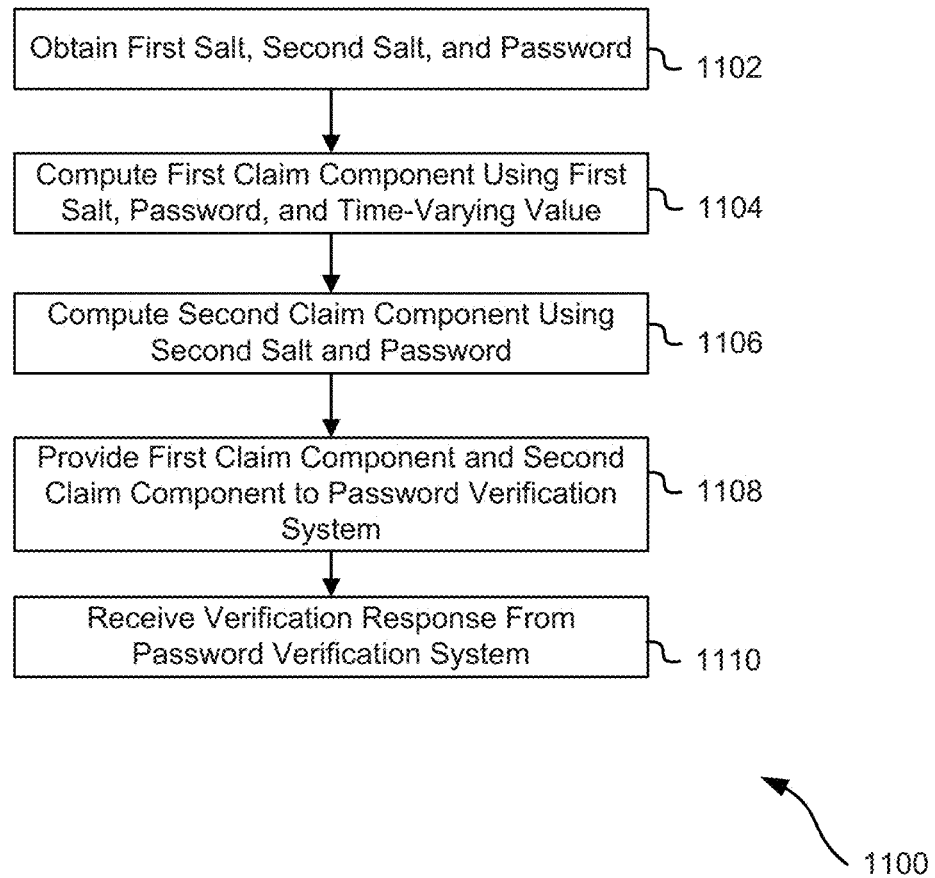
FIG. 11 shows an illustrative example of a process for obtaining access to one or more computing resources in accordance with at least one embodiment.

FIG. 11 shows an illustrative example of a process 1100 for proving possession of a password in accordance with an embodiment. As with other processes described herein for proving possession of a password, the process 1100 may be performed by a client device, such as described above, or, generally, any suitable device. As illustrated in FIG. 11, the process 1100 includes obtaining 1102 a first salt, second salt and password. The salt and password may be obtained in any suitable manner such as described above. For instance, a first salt and a second salt may be obtained from memory, either local or remote and the password may be obtained either from memory or from user input, which may be prompted by performance of the process 1100.

In an embodiment, the process 1100 includes computing a password claim that has multiple components. In this example, the process 1100 includes computing 1104 a first claim component using a first salt and password and a time-varying value. The time-varying value may be, for instance, a current date; and a current time, the accuracy of which may be on the order of minutes, hours or other delineations; and may generally be any value that changes over time. As yet another illustrative example, the time-varying value may be a randomly generated, counter-generated or otherwise generated number that is updated periodically or otherwise multiple times over time. When the password claim has been submitted as part of or otherwise in connection with an electronic request (e.g., request to authenticate, request for access to a computing resource, request to perform an operation, or other request), the time-varying value may be said to be dependent from the electronic request. Other information dependent from the request may also be used in addition to or instead of the time-varying value. Generally, the first component may be based at least in part on a cryptographic operation involving a key and information about the electronic request. For instance, a timestamp is information about the request that indicates an approximate time of the request. Information about the request may also, generally, be publically determinable. A timestamp, for example, may be generated by a computer system without non-public information available to it. As another example, information about the request that is publicly determinable may include information identifying a service to be accessed in connection with the request. Information about the request may also include information such as a cryptographic nonce (e.g., an arbitrary or effectively arbitrary number or other information). Such information may be unique to the electronic request.

In an embodiment, the process 1100 also includes computing 1106 a second claim component using a second salt and the password. The second component may include an encoding of a key that is generated based at least in part on the second salt and the password. The first claim component and second claim component may then be provided 1108 to a password verification system. A verification response from the password verification system may be received 1110, such as described above. It should be noted that, as with other processes described herein, variations are considered as being within the scope of the present disclosure and such variations are not necessarily described explicitly here. For instance, FIG. 11 shows computation of a first claim component and second claim component in a particular order, although it should be understood that, in this example order, the order may be different. Orders of other actions described herein may also, in many instances, be different than as explicitly described and those with skill in the art will understand that many actions described in connection with the illustrations may be performed in a different order and that, in some instances, fewer actions may be performed and/or more actions may be performed.

Figure 12:
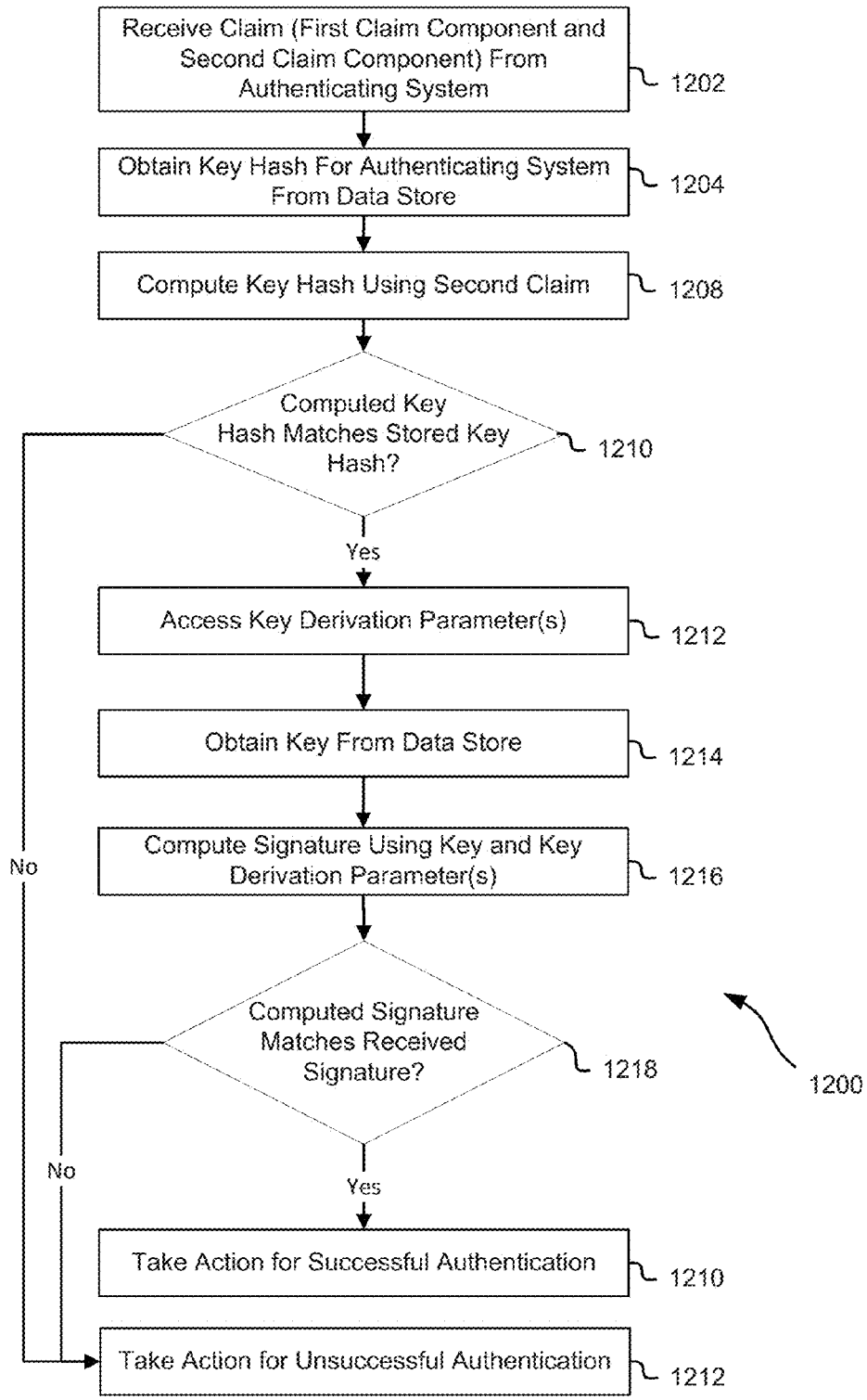
FIG. 12 shows an illustrative example of a process for verifying a password in accordance with at least one embodiment.

FIG. 12 shows an illustrative example of a process 1200 for verifying possession of a password in accordance with an embodiment. The process 1200 may be performed, for example, by a password verification system, such as described above, or, generally, any suitable computing device that verifies passwords. In an embodiment, the process 1200 includes receiving a password claim from an authenticating system, such as from a client computing system described above. The password claim may include various components such as the first claim component and second claim component such as described above in connection with FIG. 11. The components of the password claim may be received in a single transmission or in multiple transmissions. In an embodiment, the process includes obtaining 1204 a key hash for the authenticating system from a data store such as a data store storing a database described above in connection with FIG. 10 or an otherwise suitable database or organization of information. Obtaining the key hash may be performed, for instance, by querying a database with the key hash for the appropriate value. The query may, for instance, indicate a username or other identifier of the authenticating party.

In an embodiment, the process 1200 also includes computing 1208 a key hash using a second claim. A determination may then be made 1210 whether the computed key hash matches the stored key that was obtained from the data store. If it is determined 1210 that the computed key hash matches the stored key hash, a computing device performing the process 1200 may proceed to access 1212 one or more key derivation parameters such as described above. Accessing the key derivation key parameters may be done, for instance, by accessing from memory, receiving from another computer system or computing the one or more key derivation parameters. A key then may be obtained 1214 from a data store. For example, referring to FIG. 10, a key from an appropriate entry in the third column may be obtained. A signature may be computed 1216, using the key and the key derivation parameters. A determination may then be made 1218 whether the computed signature matches the received signature such as described above. If it is determined that the computed signature matches the received signature, then action for successful authentication may be taken 1210. Similarly, if it is determined that a computed signature does not match the received signature, or if it is determined 1210 that the computed key hash does not match the stored key hash, then action for unsuccessful authentication may be taken 1212, such as described above. In this manner, both components of the password claim need to be verified in order for a claim to access to the password to be successful. Further, an technical advantage is achieved because unauthorized access to the database and interception of the password claim each, by themselves, do not provide for unauthorized authentication by a party other than an authorized party.

It should be noted, as with all processes described herein, variations are considered as being within the scope of the present disclosure. For example, FIG. 12 shows determining whether a computed key hash matches a store key hash before determining whether a computed signature matches a received signature. It should be noted that these determinations do not necessarily need to be made in this order and it should be noted that computing whether making one determination does not necessarily need to be dependent on the result of another determination. Generally, any process for making both determinations may be used. In addition, other determinations may also be included in performance of variations of the process 1200.

In addition, the present disclosure provides numerous illustrative examples of various embodiments of the present disclosure, but that the scope of the disclosure is not limited to those explicitly described herein. For example, passwords are used for the purpose of illustration since passwords are common in authentication schemes. However, the scope of the present disclosure is not limited to passwords in the traditional sense, that is, the disclosure is not limited to strings that users commit to memory and provide upon request of computer system requiring authentication. Indeed, the scope of the present disclosure also includes use of other information that can be used for authentication. As an example, biometric information (fingerprints, retina scans, voice data, DNA, facial recognition data and other biometric information) may be used in addition to or instead of traditional passwords. As another example, a numerical value provided by an RSA SecurID or other token device may be used in addition to or instead of traditional passwords. Generally, any information (i.e., credential) that can be used to ensure that a party attempting authentication is authorized may be used instead of or in addition to traditional passwords.

Figure 13:
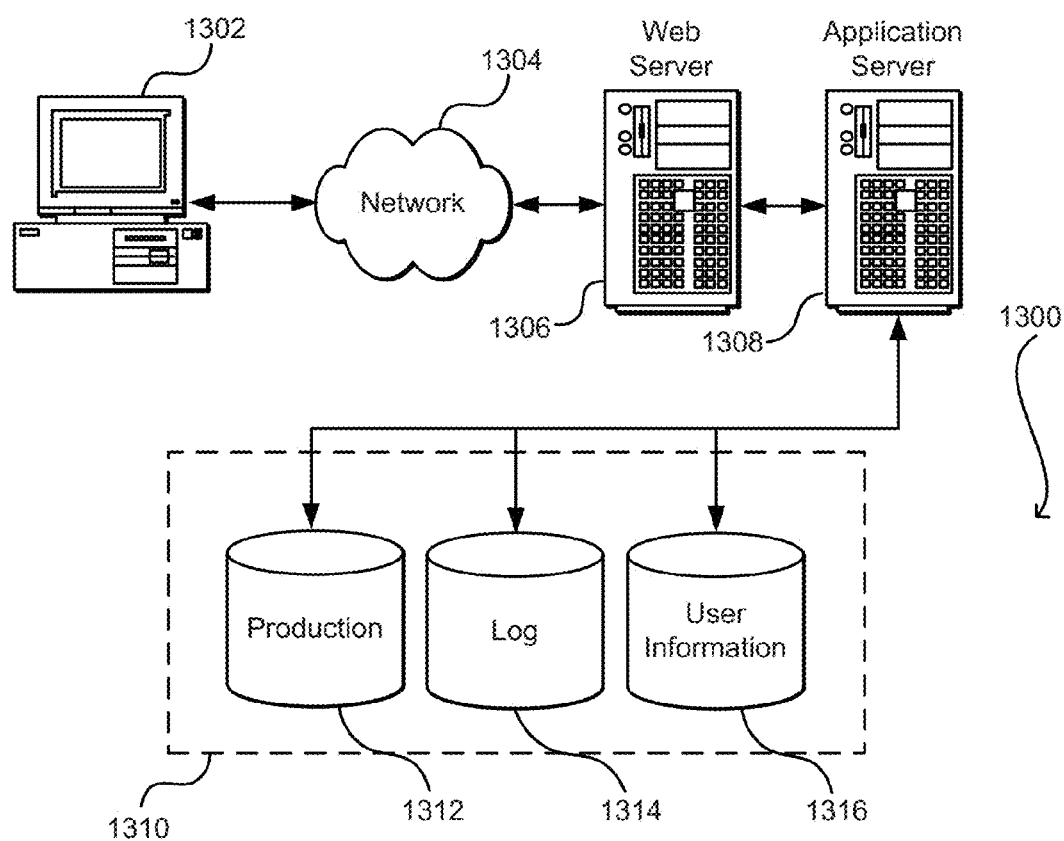
FIG. 13 shows an illustrative example of an environment in which various aspects of the present disclosure may be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HTML, XML, or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers. FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for authentication, comprising:
   under the control of one or more computer systems configured with executable instructions,
     obtaining an electronic claim of access to a password, the claim comprising:
       a first component comprising first information based at least in part on an electronic signature, the electronic signature based at least in part on a first key and a time-dependent value, the first key derived based at least in part on the password; and
       a second component comprising second information based at least in part on a second key, the second key being at least: different from the first key; derived based at least in part on a derivation function utilizing the password and a second salt value as inputs, where the second salt value is stored by a computing resource service provider; and the second key being unavailable to the one or more computer systems until at least obtaining the electronic claim of access to the password;
     computing, based at least in part on the first key, a first reference component;
     computing, based at least in part on the second key from the electronic claim, a second reference component; and
     enabling access to at least one computing resource as a result of both the first reference component matching the first component and the second component matching the second reference component.

2. The computer-implemented method of claim 1, wherein:
   computing the second reference component further comprises computing a result of a derivation function utilizing the second salt value and the password; and
   enabling access to at least one computing resource further comprises comparing the second reference component with the stored second reference component accessed from memory of the one or more computer systems.

3. The computer-implemented method of claim 1, wherein the method further comprises:
   comparing the second reference component with the stored second reference component accessed from memory of the one or more computer systems; and
   updating automatically the stored second reference component multiple times over a time period.

4. The computer-implemented method of claim 3, wherein each update of at least a subset of the updates of the stored second reference component is based at least in part on information provided from a key distribution system, the information being based at least in part on the password and information specific to a key-use zone containing the one or more computer systems, where the information specific to the key-use zone results in a corresponding restriction of use of the first key or the second key to the at least one computing resource.

5. The non-transitory computer computer-implemented method of claim 1, wherein the time-dependent value further comprises current time information.

6. The non-transitory computer computer-implemented method of claim 1, wherein the second salt value is maintained by the computing resource service provider further comprises maintaining the second salt value in a record of a database associated with the password.

7. A computer-implemented method for authentication, comprising:
   under the control of one or more computer systems configured with executable instructions,
     obtaining information from a computing device attempting authentication;
     determining whether the obtained information is valid based at least in part on:

first information accessed from data storage accessible to the one or more computer systems and based at least in part on a first key, the first key based at least in part on a derivation function including a first salt value and a password, where the password is provided by the computing device attempting authentication; and second information based at least in part on at least a second key different from the first key and a second salt value, where the second salt value is stored in the data storage accessible to the one or more computer systems, and the second key is unavailable to the one or more computer systems until at least obtaining the information from the computing device attempting authentication;

wherein neither the first information nor the second information is alone sufficient for authentication; and taking one or more actions that are dependent on a determination that the obtained information is valid.

8. The computer-implemented method of claim 7, wherein the first information is based at least in part on a result of a cryptographic operation performed on the first salt value and the password.

9. The computer-implemented method of claim 8, wherein the cryptographic operation involves at least one of a hash function, hash-based message authentication code, an asymmetric signature, a symmetric signature or an encryption.

10. The computer-implemented method of claim 7, wherein:
obtaining the information includes receiving the information in connection with an electronic request; and
the obtained information includes information dependent on the electronic request and information independent from the request.

11. The computer-implemented method of claim 10, wherein the information independent from the request is a password-derived key or hash maintained by the one or more computer systems and the second information is based at least in part on a result of applying at least a hash function to the information independent from the request and obtained from memory of at least one of the one or more computer systems.

12. The computer-implemented method of claim 7, wherein:
the first information further includes an electronic signature based at least in part on the first key and time information associated with the obtained information;
the second key is derived based at least in part on the password and the second salt value, where the second salt value is obtained for a database maintained by the one or more computer systems; and
the one or more computer systems lack access to the second key prior to receiving the obtained information.

13. The computer-implemented method of claim 12, wherein the first key and the second key are derived based at least in part on secret information.

14. The computer-implemented method of claim 7, wherein the second information comprises information that is valid for authentication by the one or more computer systems for a limited time.

15. The computer-implemented method of claim 7, wherein:
determining whether the obtained information is valid comprises:

computing, based at least in part on the first information, an electronic signature;
computing, based at least in part on the second information, a hash value; and
determining whether the computed electronic signature matches a provided electronic signature of the obtained information and whether the computed hash value matches hash information in data storage accessible to the one or more computer systems.

16. The computer-implemented method of claim 15, wherein:
computing the electronic signature is further based at least in part on a time-dependent parameter; and
determining that the obtained information is valid requires the obtained information to have been generated in accordance with the time-dependent parameter.

17. A computer system, comprising:
one or more processors; and
memory including instructions that, when executed by the one or more processors, cause the computer system to at least:
obtain information from computing devices attempting authentication;
for each party of a plurality of parties, access information specific to the party from a data store to determine whether the party is authentic, where determining whether the party is authentic requires at least that:
first reference information, computed based at least in part on an electronic signature, the electronic signature based at least in part on a first key and a time-dependent value, the first key computed based at least in part on a first result of a derivation function utilizing a password and a first salt value, matches the obtained information; and
second reference information, different from the first reference information and computed based at least in part on a second result of the derivation function utilizing the password and a second salt value, where the second salt value is stored in the data store, matches the information specific to the party, maintained by a computing resource service provider, and the second reference information is unavailable until obtained from the party; and
take one or more actions that are dependent on a determination that the party is authentic.

18. The computer system of claim 17, wherein:
the first reference information is based at least in part on the first key which includes information specific to the party;
the second reference information is based at least in part on a second key of the obtained information, where the second key is different from the first key; and
the first key and the second key are derived from a password.

19. The computer system of claim 17, wherein the second reference information is based at least in part on an electronic signature generated based at least in part on the information specific to the party and maintained by the computing resource service provider.

20. The computer system of claim 17, wherein the first reference information is computed further based at least in part on a value, the value depends on a time at which the value was obtained.

21. The computer system of claim 17, wherein the first reference information and second reference information are based at least in part on a common key to which the computer system lacks access.

22. The computer system of claim 17, wherein the instructions further cause the computer system to automatically update the information specific to the party multiple times over a time period.

23. A non-transitory computer-readable storage medium having stored thereon instructions that, when executed by one or more processors of a computer system, cause the computer system to at least:
- in connection with an electronic request involving access to one or more computing resources, generate a secret information claim comprising at least:
  - a first component based at least in part on a cryptographic operation involving a first key, the first key determined based at least in part on a result of providing secret information and a first salt value as inputs to a derivation function, and information about the electronic request; and
  - an encoding of a second key that is different from the first key, the second key being derived based at least in part on secret information and a second salt value, the second key being unavailable to an authentication computer system until receiving the secret information claim; and
- transmit the generated secret information claim to the authentication computer system to obtain access to the one or more computing resources for which successful authentication is required.

24. The non-transitory computer computer-readable storage medium of claim 23, wherein the information about the electronic request is based at least in part on a current time.

25. The non-transitory computer computer-readable storage medium of claim 23, wherein the information about the electronic request is publicly determinable.

26. The non-transitory computer computer-readable storage medium of claim 23, wherein the first component comprises an electronic signature generated based at least in part on the first key.

27. The non-transitory computer computer-readable storage medium of claim 23, wherein the generated secret information further includes the first component and a second component based at least in part on the second key.

28. The non-transitory computer computer-readable storage medium of claim 23, wherein:
- the instructions, when executed by the one or more processors, further cause the computer system to select a key-use zone from a plurality of key-use zones; and
- the first component is generated further based at least in part on information specific to the selected key-use zone.

29. The non-transitory computer computer-readable storage medium of claim 28, wherein:
- the instructions, when executed by the one or more processors, further cause the computer system to select a sub-key-use zone for the selected key-use zone; and
- the first component is generated further based at least in part on information specific to the selected sub-key-use zone.

30. The non-transitory computer computer-readable storage medium of claim 23, wherein the second salt value is not included in the electronic request.

* * * * *